(12) United States Patent
Zhong et al.

(10) Patent No.: US 11,986,794 B1
(45) Date of Patent: May 21, 2024

(54) PREPARATION METHOD FOR AND USE OF LITHIUM SILICATE-BASED ADSORBENT

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Yingsheng Zhong, Guangdong (CN); Haijun Yu, Guangdong (CN); Yinghao Xie, Guangdong (CN); Aixia Li, Guangdong (CN); Jianfeng Xu, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/284,757

(22) PCT Filed: Nov. 10, 2022

(86) PCT No.: PCT/CN2022/131107
§ 371 (c)(1),
(2) Date: Sep. 28, 2023

(87) PCT Pub. No.: WO2023/130830
PCT Pub. Date: Jul. 13, 2023

(30) Foreign Application Priority Data

Jan. 5, 2022 (CN) .......................... 202210009516.7

(51) Int. Cl.
| | | |
|---|---|---|
| *B01J 20/10* | (2006.01) | |
| *B01J 20/30* | (2006.01) | |
| *C02F 1/28* | (2023.01) | |
| *C02F 101/10* | (2006.01) | |
| *C02F 103/34* | (2006.01) | |

(52) U.S. Cl.
CPC ............ *B01J 20/10* (2013.01); *B01J 20/3078* (2013.01); *B01J 20/3085* (2013.01); *C02F 1/281* (2013.01); *C02F 2101/10* (2013.01); *C02F 2103/34* (2013.01)

(58) Field of Classification Search
CPC .... B01J 20/10; B01J 20/3078; B01J 20/3085; C02F 1/281; C02F 2101/10; C02F 2103/34

USPC ......................................................... 502/407
See application file for complete search history.

(56) References Cited

U.S. PATENT DOCUMENTS

| | | | |
|---|---|---|---|
| 4,081,403 | A | 3/1978 | Takegami et al. |
| 2007/0187334 | A1 | 8/2007 | Davis et al. |
| 2016/0207796 | A1 | 7/2016 | Li et al. |

FOREIGN PATENT DOCUMENTS

| | | |
|---|---|---|
| CN | 102766917 A | 11/2012 |
| CN | 104998608 A | 10/2015 |
| CN | 107383392 A | 11/2017 |
| CN | 107501483 A | 12/2017 |
| CN | 108479691 A | 9/2018 |
| CN | 109336251 A | 2/2019 |
| CN | 110115990 A | 8/2019 |
| CN | 110170315 A | 8/2019 |
| CN | 112090394 A | 12/2020 |
| CN | 114307990 A | 4/2022 |
| JP | S52-59088 A | 5/1977 |
| JP | 2019-214037 A | 12/2019 |
| WO | 2017/022249 A1 | 2/2017 |

OTHER PUBLICATIONS

International search report with the Written Opinion of the International Searching Authority issued by the China National Intellectual Property Administration for International Patent Application No. PCT/CN2022/131107, mailed on Feb. 7, 2023, with an English translation of the International Search Report and conclusions from the Written Opinion.
First Notification of Office Action and Search Report issued by the China National Intellectual Property Administration for Chinese Patent Application No. 202210009516.7, mailed on Apr. 22, 2023, with an English translation.
Zhang et al., "Adsorption Characteristics of Crystal Violet Dye by Different Types of Hydrogels", Materials Engineering, Dec. 2011, vol. 343, No. 12, pp. 20-24, with an English abstract.

*Primary Examiner* — Edward M Johnson
(74) *Attorney, Agent, or Firm* — MYERS WOLIN, LLC

(57) ABSTRACT

The present invention discloses a preparation method for and the use of a lithium silicate-based adsorbent. The method comprises: mixing and stirring butyl methacrylate, an acid and an organic solvent to obtain a first solution; adding lithium silicate, an initiator and N,N'-methylenebisacrylamide into the first solution, and heating and stirring same for a reaction to obtain a second solution; subjecting the second solution to low-temperature dehydration, cooling and drying to obtain a lithium silicate-based polymer; mixing the lithium silicate-based polymer with a third solution; and subjecting same to low-temperature carbonization under anoxic conditions, so as to obtain the lithium silicate-based adsorbent, wherein the third solution is obtained by mixing cotton fibers, tartaric acid, carboxymethylcellulose and water.

20 Claims, 2 Drawing Sheets

PREPARATION METHOD FOR AND USE OF LITHIUM SILICATE-BASED ADSORBENT

CROSS-REFERENCE TO RELATED APPLICATION

This application is a national stage application under 35 U.S.C. § 371 of international application number PCT/CN2022/131107, filed Nov. 10, 2022, which claims priority to Chinese patent application No. 202210009516.7, filed Jan. 5, 2022. The contents of these applications are incorporated herein by reference in their entirety.

TECHNICAL FIELD

The present invention belongs to the field of wastewater treatment technologies, and more particularly, relates to a preparation method of a lithium-silicate-based adsorbent and an application thereof.

BACKGROUND

A mainstream recycling technology of waste power batteries is a fire method-wet method combined recycling technology at the present stage. The technology comprises the following steps of: (1) dismantling and discharging the waste power batteries; (2) drying and pyrolysis; (3) crushing and sieving; (4) adding an acid to leach electrode powder; (5) removing copper, iron and aluminum; (6) extracting and separating by multiple steps, recycling lithium salt from raffinate wastewater to prepare lithium hydroxide; (7) adding alkali for aging; and (8) synthesizing a precursor, and sintering the precursor and the lithium salt to obtain a cathode material. In the steps (1) to (8) above, products such as nickel, cobalt, manganese and lithium and by-products such as aluminum, copper, iron and graphite in the waste power batteries are recycles and used in step (8).

In step (6), the raffinate wastewater from "recycling lithium salt from raffinate wastewater to prepare lithium hydroxide" is subjected to biochemical treatments such as flocculation precipitation, anaerobic treatment and anoxic treatment with polyacrylamide and polyaluminum chloride to remove COD, and then conveyed to a MVR system of a lithium salt workshop for evaporation to obtain lithium carbonate. However, the wastewater subjected to the biochemical treatments still contains a considerable amount of organic matter, ammonia nitrogen, bacteria and other substances that affect a COD content. The raffinate wastewater subjected to the biochemical treatments has a poor biodegradability, and it is difficult to remove the organic matter in the recycled water after the biochemical treatments by a conventional treatment technology, while the COD in the raffinate wastewater is one of important factors affecting a purity of lithium hydroxide crystal salt obtained by evaporation. In addition, the inventor also removed the COD from the wastewater by activated carbon adsorption treatment, but found that a concentration of lithium in the wastewater was reduced obviously after the activated carbon adsorption treatment, so that activated carbon adsorption substances had an adsorption consistency, and a purpose of selective adsorption of the COD could not be achieved. Therefore, a reasonable and effective method to remove the COD in the wastewater is needed, which can reduce an interference to a concentration of lithium in the wastewater at the same time.

SUMMARY

The present invention aims to solve at least one of the technical problems in the existing technology above. Therefore, the present invention provides a preparation method of a lithium-silicate-based adsorbent and an application thereof, the lithium-silicate-based adsorbent can adsorb and remove COD in wastewater subjected to flocculation precipitation, anaerobic treatment and anoxic treatment, without affecting a concentration of lithium in the wastewater.

According to an aspect of the present invention, a preparation method of a lithium-silicate-based adsorbent is provided, which comprises the following steps of:

S1: mixing and stirring butyl methacrylate, an acid and an organic solvent to obtain a first solution, adding lithium silicate, an initiator and N,N'-methylene bisacrylamide into the first solution, heating and stirring the mixture for reaction to obtain a second solution, and subjecting the second solution to low-temperature dehydration, cooling and drying to obtain a lithium-silicate-based polymer; and S2: mixing the lithium-silicate-based polymer with a third solution, and carbonizing the mixture at low temperature under an anoxic condition to obtain a lithium-silicate-based adsorbent, wherein the third solution is obtained by mixing a cotton fiber, a tartaric acid and a carboxymethyl cellulose with water.

In some implementations of the present invention, in step S1, a mass ratio of the butyl methacrylate to the acid and the organic solvent is (0.1 to 5):(0.01 to 2):(0.01 to 1), a concentration of the acid ranges from 0.02 mol/L to 0.10 mol/L, and the organic solvent is at least one of ethylene glycol, glycerin or propylene glycol.

In some implementations of the present invention, the lithium silicate is one of $Li_2O \cdot SiO_2$ or $2Li_2O \cdot SiO_2$.

In some implementations of the present invention, in step S1, the acid is at least one of sulfuric acid, hydrochloric acid, formic acid or acetic acid.

In some implementations of the present invention, in step S1, a liquid-solid ratio of the first solution to the lithium silicate and the N,N'-methylene bisacrylamide is (1 to 5) ml:(1 to 2) g:(0.1 to 0.5) g.

In some implementations of the present invention, in step S1, the initiator is at least one of di-tert-butyl peroxide, tert-butyl peroxybenzoate or di-tert-amyl peroxide; and the heating is carried out at a temperature of 150° C. to 170° C.

In some implementations of the present invention, in step S2, a solid-liquid ratio of the lithium-silicate-based polymer to the third solution is (70 to 120):(5 to 50) g/ml. Further preferably, the solid-liquid ratio of the lithium-silicate-based polymer to the third solution is (90 to 140):(10 to 40) g/ml.

In some implementations of the present invention, in step S2, in the third solution, a mass ratio of the cotton fiber to the tartaric acid and the carboxymethyl cellulose is (0.1 to 5):(0.01 to 2):(0.01 to 1).

In some implementations of the present invention, in step S2, the carbonizing at low temperature is carried out at a temperature of 120° C. to 300° C., and lasts for 8 hours to 24 hours.

In some implementations of the present invention, in step S2, the anoxic condition is to introduce rare gas, nitrogen or deoxygenated air.

The present invention also provides a method for removing COD in wastewater, which comprises the following steps of: mixing the lithium-silicate-based adsorbent prepared by the preparation method with alcohol, heating the mixture for reaction to obtain a hydrophilic lithium-silicate-based adsorbent, attaching the hydrophilic lithium-silicate-based adsorbent to a carrier, and then placing the carrier at an overflow port, a water outlet or a water passage sink of a flocculation precipitation tank, an anaerobic tank or an anoxic tank for adsorption treatment. The wastewater is wastewater subjected to biochemical treatments such as flocculation precipitation, anaerobic treatment or anoxic treatment.

In some implementations of the present invention, a solid-liquid ratio of the lithium-silicate-based adsorbent to the alcohol is 10:(1 to 5) g/ml; and the heating is carried out at a temperature of 50° C. to 80° C., and lasts for 10 minutes to 2 hours.

In some implementations of the present invention, the adsorption treatment lasts for 1 hour to 2 hours.

In some implementations of the present invention, the alcohol is at least one of methanol, ethanol or propanol.

In some implementations of the present invention, a way of attaching to the carrier may be spraying or coating the hydrophilic lithium-silicate-based adsorbent on the carrier attached with a binder, or mixing the binder and the hydrophilic lithium-silicate-based adsorbent to spray or coat on the carrier attached with the binder. Further, the binder is at least one of furan resin, phenolic resin, polyurethane or sodium silicate sand, and a mixing ratio of the binder to the hydrophilic lithium-silicate-based adsorbent is (1 to 5):(50 to 120) ml/g.

In some implementations of the present invention, the carrier is at least one of foam, wood, metal, composite board, grid, mesh, pipe or fabric.

According to a preferred implementation of the present invention, the present invention at least has the following beneficial effects.

1. According to the present invention, the lithium-silicate-modified polymer is synthesized first, then the third solution containing the cotton fiber is added on this basis for mixing, since the third solution contains the fiber, a structural strength of the adsorbent is enhanced, and the porous and reticulated lithium-silicate-based adsorbent is obtained; and in addition, a specific surface area of the adsorbent formed is higher, large pores are formed in the cotton fiber, and the lithium-silicate-based polymer has small pores, so that pore diameter distribution of the adsorbent is adjusted.
2. Considering a hydrophobicity of the butyl methacrylate in the lithium-silicate-based polymer, the tartaric acid and the carboxymethyl cellulose are added in the third solution as dispersants, so that after the third solution is mixed with the lithium-silicate-based polymer, the cotton fiber has a better and more uniform dispersibility, thus indirectly improving a structural homogeneity and stability of the adsorbent.
3. Before the adsorption treatment, in order to improve a hydrophilicity and an adsorption capacity of the lithium-silicate-based adsorbent material, the lithium-silicate-based adsorbent is subjected to an alcohol-thermal activation reaction, and the lithium-silicate-based adsorbent subjected to the alcohol-thermal activation reaction has a better hydrophilicity and an improved adsorption performance.
4. The lithium-silicate-based adsorbent material prepared by the present invention has a function of selectively adsorbing COD in wastewater, which is mainly because that the lithium-silicate-based adsorbent material has more lithium sites, with correspondingly weak lithium adsorption and poor lithium adsorption capacity, so that the lithium-silicate-based adsorbent material has the function of absorbing the COD in the wastewater selectively, and has little interference to the lithium in the wastewater.
5. The lithium-silicate-based adsorbent can absorb water, and can be soaked in high-concentration wastewater without deformation, thus having a good stability; and the lithium silicate and the cotton fiber are cheap raw materials, so that the adsorbent prepared by the present invention has low costs.

BRIEF DESCRIPTION OF DRAWINGS

The present invention is further described hereinafter with reference to the drawings and the embodiments, wherein.

DETAILED DESCRIPTION

Figure 1:
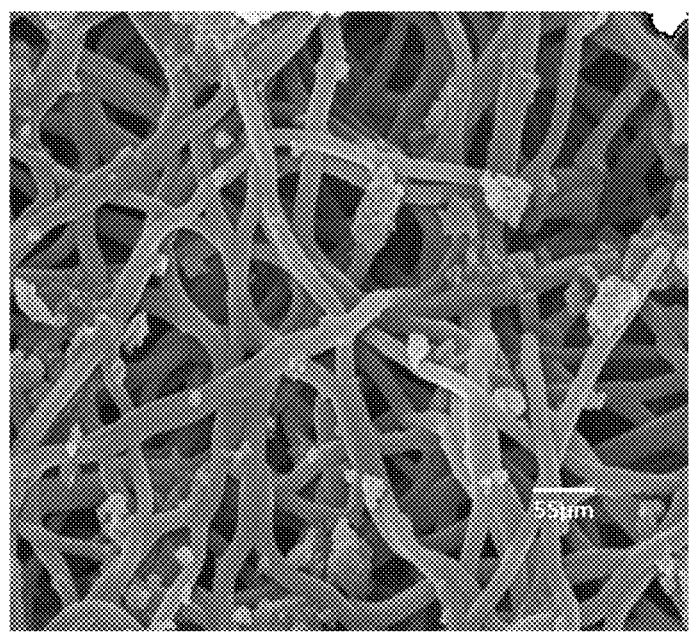
FIG. 1 is a SEM graph of a lithium-silicate-based adsorbent in Embodiment 2 of the present invention.

The concept and the generated technical effects of the present invention are clearly and completely described hereinafter with reference to the embodiments to fully understand the objectives, the features and the effects of the present invention. Obviously, the described embodiments are only some but not all of the embodiments of the present invention, and based on the embodiments of the present invention, other embodiments obtained by those skilled in the art without going through any creative work all belong to the scope of protection of the present invention.

Embodiment 1

In this embodiment, a lithium-silicate-based adsorbent was prepared by a specific process as follows:

1. preparing a lithium-silicate-based polymer: mixing butyl methacrylate, 0.07 mol/L of formic acid and glycerin according to a mass ratio of 2:1:1 in an acid-proof cup, placing the acid-proof cup in a water bath kettle at 55° C. for stirring for 4 hours to obtain a first solution, then adding $Li_2O \cdot SiO_2$, N,N'-methylene bisacrylamide and an initiator into the first solution, and stirring the mixture for reaction at 150° C. for 5 hours to obtain a second solution (wherein, a ratio of the first solution to lithium silicate and the N,N'-methylene bisacrylamide was 1.5:1:0.2 (ml/g/g), and an addition amount of the initiator was 5% of a total amount of the butyl methacrylate and the N,N'-methylene bisacrylamide), and conveying the second solution to an oven for subjecting to low-temperature dehydration at 85° C., cooling and drying to obtain the brown lithium-silicate-based polymer;
2. preparing a porous and reticulated lithium-silicate-based adsorbent: mixing 100 ml of waterproof cotton fiber, tartaric acid and carboxymethyl cellulose according to a mass ratio of 1.2:0.2:0.05 and evenly stirring the same by a magnetic force to obtain a third solution, mixing the lithium-silicate-based polymer and the third solution according to a ratio of 100:30 (g/ml), and placing the mixture in a tube furnace for carbonizing at a low temperature of 140° C. for 10 hours under a nitrogen gas flow to obtain the black porous and reticulated lithium-silicate-based adsorbent; and 3. removing COD in wastewater by using the lithium-silicate-based adsorbent: soaking the lithium-silicate-based adsorbent and ethanol according to a ratio of 10:3 (g/ml), then conveying the mixture to an oven for an alcohol-thermal activation reaction at 50° C. for 12 minutes, hydrophilizing and cooling the mixture to obtain the hydrophilic lithium-silicate-based adsorbent, coating a polypropylene mesh fabric with sodium silicate sand, spraying 50 g of hydrophilic lithium-silicate-based adsorbent on the polypropylene mesh fabric, and placing the polypropylene mesh fabric at an overflow port of an anaerobic tank for adsorption treatment for 1.5 hours.

Embodiment 2

In this embodiment, a lithium-silicate-based adsorbent was prepared by a specific process as follows.
1. preparing a lithium-silicate-based polymer: mixing butyl methacrylate, 0.07 mol/L of formic acid and glycerin according to a mass ratio of 2:0.5:1 in an acid-proof cup, placing the acid-proof cup in a water bath kettle at 65° C. for stirring for 4 hours to obtain a first solution, then adding $Li_2O \cdot SiO_2$, N,N'-methylene bisacrylamide and an initiator into the first solution, and stirring the mixture for reaction at 150° C. for 5 hours to obtain a second solution (wherein, a ratio of the first solution to lithium silicate and the N,N'-methylene bisacrylamide was 2.0:1.5:0.23 (ml/g/g), and an addition amount of the initiator was 5% of a total amount of the butyl methacrylate and the N,N'-methylene bisacrylamide), and conveying the second solution to an oven for subjecting to low-temperature dehydration at 85° C., cooling and drying to obtain the brown lithium-silicate-based polymer;
2. preparing a porous and reticulated lithium-silicate-based adsorbent: mixing 100 ml of waterproof cotton fiber, tartaric acid and carboxymethyl cellulose according to a mass ratio of 2.2:0.56:0.27 and evenly stirring the same by a magnetic force to obtain a third solution, mixing the lithium-silicate-based polymer and the third solution according to a ratio of 100:35 (g/ml), and placing the mixture in a tube furnace for carbonizing at a low temperature of 171° C. for 10 hours under a nitrogen gas flow to obtain the black porous and reticulated lithium-silicate-based adsorbent; and
3. removing COD in wastewater by using the lithium-silicate-based adsorbent: soaking the lithium-silicate-based adsorbent and ethanol according to a ratio of 10:2 (g/ml), then conveying the mixture to an oven for an alcohol-thermal activation reaction at 50° C. for 12 minutes, hydrophilizing and cooling the mixture to obtain the hydrophilic lithium-silicate-based adsorbent, coating a polypropylene mesh fabric with sodium silicate sand, spraying 50 g of hydrophilic lithium-silicate-based adsorbent on the polypropylene mesh fabric, and placing the polypropylene mesh fabric at an overflow port of an anaerobic tank for adsorption treatment for 1.5 hours.

FIG. 1 is a SEM graph of the lithium-silicate-based adsorbent in this embodiment. It can be seen from the drawing that there are more fibers in the lithium-silicate-based adsorbent, while a small number of lithium-silicate-based polymer particles are attached on the fibers, so that more fibers cover the lithium-silicate-based polymer particles.

Figure 2:
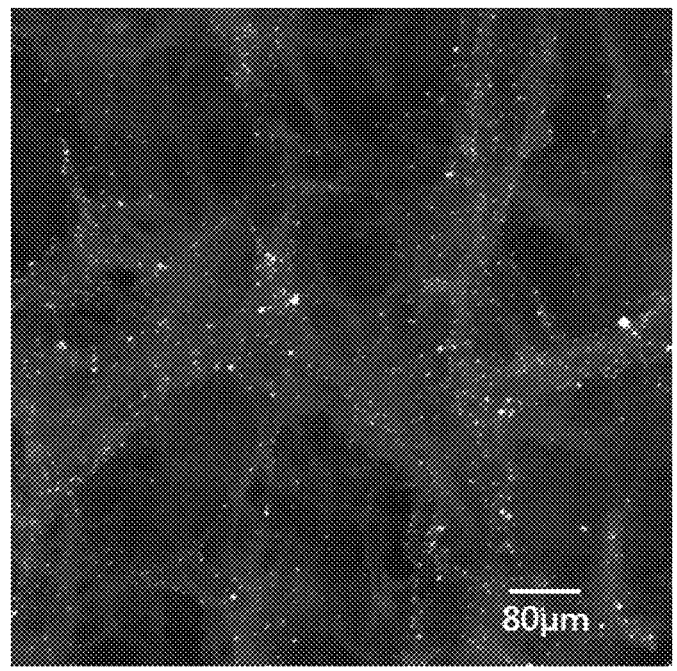
FIG. 2 is a SEM graph of low-power backscattering of the lithium-silicate-based adsorbent in Embodiment 2 of the present invention.

FIG. 2 is a SEM graph of low-power backscattering of the lithium-silicate-based adsorbent in this embodiment. It can be seen from the drawing that there are more fibers covering the lithium-silicate-based polymer, so that the lithium-silicate-based polymer particles are not obvious.

Embodiment 3

In this embodiment, a lithium-silicate-based adsorbent was prepared by a specific process as follows:
1. preparing a lithium-silicate-based polymer: mixing butyl methacrylate, 0.07 mol/L of formic acid and glycerin according to a mass ratio of 1:1:1 in an acid-proof cup, placing the acid-proof cup in a water bath kettle at 78° C. for stirring for 4 hours to obtain a first solution, then adding $Li_2O \cdot SiO_2$, N,N'-methylene bisacrylamide and an initiator into the first solution, and stirring the mixture for reaction at 150° C. for 4 hours to obtain a second solution (wherein, a ratio of the first solution to lithium silicate and the N,N'-methylene bisacrylamide was 3.6:1.2:0.32 (ml/g/g), and an addition amount of the initiator was 5% of a total amount of the butyl methacrylate and the N,N'-methylene bisacrylamide), and conveying the second solution to an oven for subjecting to low-temperature dehydration at 85° C., cooling and drying to obtain the brown lithium-silicate-based polymer;
2. preparing a porous and reticulated lithium-silicate-based adsorbent: mixing 100 ml of waterproof cotton fiber, tartaric acid and carboxymethyl cellulose according to a mass ratio of 3.4:0.85:0.48 and evenly stirring the same by a magnetic force to obtain a third solution, mixing the lithium-silicate-based polymer and the third solution according to a ratio of 95:40 (g/ml), and placing the mixture in a tube furnace for carbonizing at a low temperature of 220° C. for 20 hours under a nitrogen gas flow to obtain the black porous and reticulated lithium-silicate-based adsorbent; and
3. removing COD in wastewater by using the lithium-silicate-based adsorbent: soaking the lithium-silicate-based adsorbent and ethanol according to a ratio of 10:3.5 (g/ml), then conveying the mixture to an oven for an alcohol-thermal activation reaction at 50° C. for 12 minutes, hydrophilizing and cooling the mixture to obtain the hydrophilic lithium-silicate-based adsorbent, coating a polypropylene mesh fabric with sodium silicate sand, spraying 50 g of hydrophilic lithium-silicate-based adsorbent on the polypropylene mesh fabric, and placing the polypropylene mesh fabric at an overflow port of an anaerobic tank for adsorption treatment for 1.5 hours.

Embodiment 4

In this embodiment, a lithium-silicate-based adsorbent was prepared by a specific process as follows:
1. preparing a lithium-silicate-based polymer: mixing butyl methacrylate, 0.03 mol/L of sulfuric acid and glycerin according to a mass ratio of 1:1:1 in an acid-proof cup, placing the acid-proof cup in a water bath kettle at 93° C. for stirring for 4 hours to obtain a first solution, then adding $Li_2O \cdot SiO_2$, N,N'-methylene bisacrylamide and an initiator into the first solution, and stirring the mixture for reaction at 150° C. for 5 hours to obtain a second solution (wherein, a ratio of the first solution to lithium silicate and the N,N'-methylene bisacrylamide was 2.7:1.3:0.16 (ml/g/g), and an addition amount of the initiator was 6% of a total amount of the butyl methacrylate and the N,N'-methylene bisacrylamide), and conveying the second solution to an oven for subjecting to low-temperature dehydration at 98° C., cooling and drying to obtain the brown lithium-silicate-based polymer;
2. preparing a porous and reticulated lithium-silicate-based adsorbent: mixing 100 ml of waterproof cotton fiber, tartaric acid and carboxymethyl cellulose according to a mass ratio of 4.0:1.25:0.60 and evenly stirring the same by a magnetic force to obtain a third solution, mixing the lithium-silicate-based polymer and the third solution according to a ratio of 105:35 (g/ml), and placing the mixture in a tube furnace for carbonizing at a low temperature of 274° C. for 13 hours under a nitrogen gas flow to obtain the black porous and reticulated lithium-silicate-based adsorbent; and
3. removing COD in wastewater by using the lithium-silicate-based adsorbent: soaking the lithium-silicate-based adsorbent and ethanol according to a ratio of 10:4.2 (g/ml), then conveying the mixture to an oven for an alcohol-thermal activation reaction at 50° C. for 12 minutes, hydrophilizing and cooling the mixture to obtain the hydrophilic lithium-silicate-based adsorbent, coating a polypropylene mesh fabric with sodium silicate sand, spraying 50 g of hydrophilic lithium-silicate-based adsorbent on the polypropylene mesh fabric, and placing the polypropylene mesh fabric at an overflow port of an anaerobic tank for adsorption treatment for 1.5 hours.

Embodiment 5

In this embodiment, a lithium-silicate-based adsorbent was prepared by a specific process as follows:
1. preparing a lithium-silicate-based polymer: mixing butyl methacrylate, 0.03 mol/L of sulfuric acid and glycerin according to a mass ratio of 1:1:1 in an acid-proof cup, placing the acid-proof cup in a water bath kettle at 115° C. for stirring for 4 hours to obtain a first solution, then adding $Li_2O \cdot SiO_2$, N,N'-methylene bisacrylamide and an initiator into the first solution, and stirring the mixture for reaction at 150° C. for 5 hours to obtain a second solution (wherein, a ratio of the first solution to lithium silicate and the N,N'-methylene bisacrylamide was 1.5:1.2:0.1 (ml/g/g), and an addition amount of the initiator was 5% of a total amount of the butyl methacrylate and the N,N'-methylene bisacrylamide), and conveying the second solution to an oven for subjecting to low-temperature dehydration at 98° C., cooling and drying to obtain the brown lithium-silicate-based polymer;
2. preparing a porous and reticulated lithium-silicate-based adsorbent: mixing 100 ml of waterproof cotton fiber, tartaric acid and carboxymethyl cellulose according to a mass ratio of 5:1.8:0.75 (g/ml/ml) and evenly stirring the same by a magnetic force to obtain a third solution, mixing the lithium-silicate-based polymer and the third solution according to a ratio of 85:25 (g/ml), and placing the mixture in a tube furnace for carbonizing at a low temperature of 280° C. for 8 hours under a nitrogen gas flow to obtain the black porous and reticulated lithium-silicate-based adsorbent; and
3. removing COD in wastewater by using the lithium-silicate-based adsorbent: soaking the lithium-silicate-based adsorbent and ethanol according to a ratio of 10:4.5 (g/ml), then conveying the mixture to an oven for an alcohol-thermal activation reaction at 50° C. for 12 minutes, hydrophilizing and cooling the mixture to obtain the hydrophilic lithium-silicate-based adsorbent, coating a polypropylene mesh fabric with sodium silicate sand, spraying 50 g of hydrophilic lithium-silicate-based adsorbent on the polypropylene mesh fabric, and placing the polypropylene mesh fabric at an overflow port of an anaerobic tank for adsorption treatment for 1.5 hours.

Comparative Example 1 (Having No Embedded Fiber)

In this comparative example, an adsorbent was prepared by a specific process as follows:
1. preparing a lithium-silicate-based polymer: mixing butyl methacrylate, 3.7 wt % formic acid and glycerin according to a mass ratio of 2:1:1 in an acid-proof cup, placing the acid-proof cup in a water bath kettle at 55° C. for stirring for 4 hours to obtain a first solution, then adding $Li_2O \cdot SiO_2$, N,N'-methylene bisacrylamide and an initiator into the first solution, and stirring the mixture for reaction at 150° C. for 5 hours to obtain a second solution (wherein, a ratio of the first solution to lithium silicate and the N,N'-methylene bisacrylamide was 1.5:1:0.2 (ml/g/g), and an addition amount of the initiator was 5% of a total amount of the butyl methacrylate and the N,N'-methylene bisacrylamide), and conveying the second solution to an oven for subjecting to low-temperature dehydration at 85° C., cooling and drying to obtain the brown lithium-silicate-based polymer;
2. preparing a porous lithium-silicate-based adsorbent: placing the lithium-silicate-based polymer in a tube furnace for carbonizing at a low temperature of 140° C. for 10 hours under a nitrogen gas flow to obtain the black porous adsorbent; and
3. applying the adsorbent: soaking the adsorbent and ethanol according to a ratio of 10:3 (g/ml), then conveying the mixture to an oven for an alcohol-thermal activation reaction at 50° C. for 12 minutes, hydrophilizing and cooling the mixture to obtain the hydrophilic adsorbent, coating a polypropylene mesh fabric with sodium silicate sand, spraying 50 g of hydrophilic adsorbent on the polypropylene mesh fabric, and placing the polypropylene mesh fabric at an overflow port of an anaerobic tank for adsorption treatment for 1.5 hours.

Figure 3:
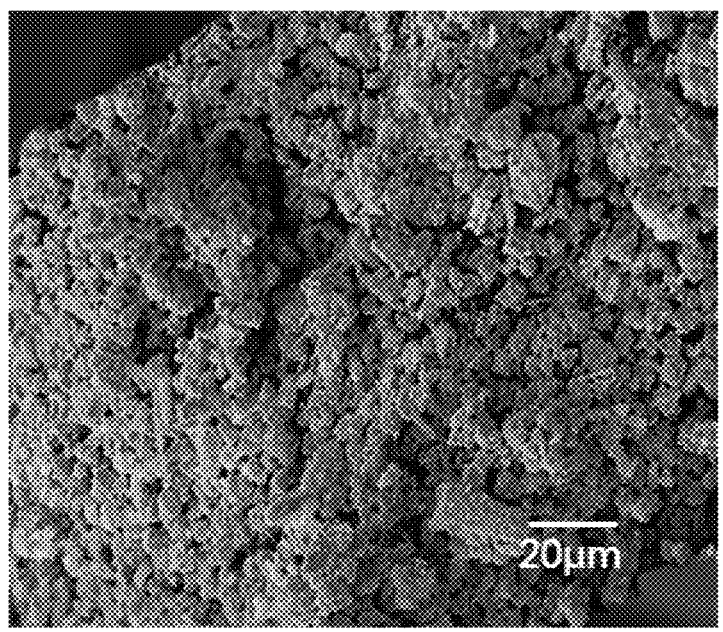
FIG. 3 is a SEM graph of an adsorbent in Comparative Example 1 of the present invention.

FIG. 3 is a SEM graph of the adsorbent in this comparative example. It can be seen from the drawing that a particle size of the adsorbent prepared is about 2 μm to 5 μm, and there are more pores, with a size greater than 1 μm.

Figure 4:
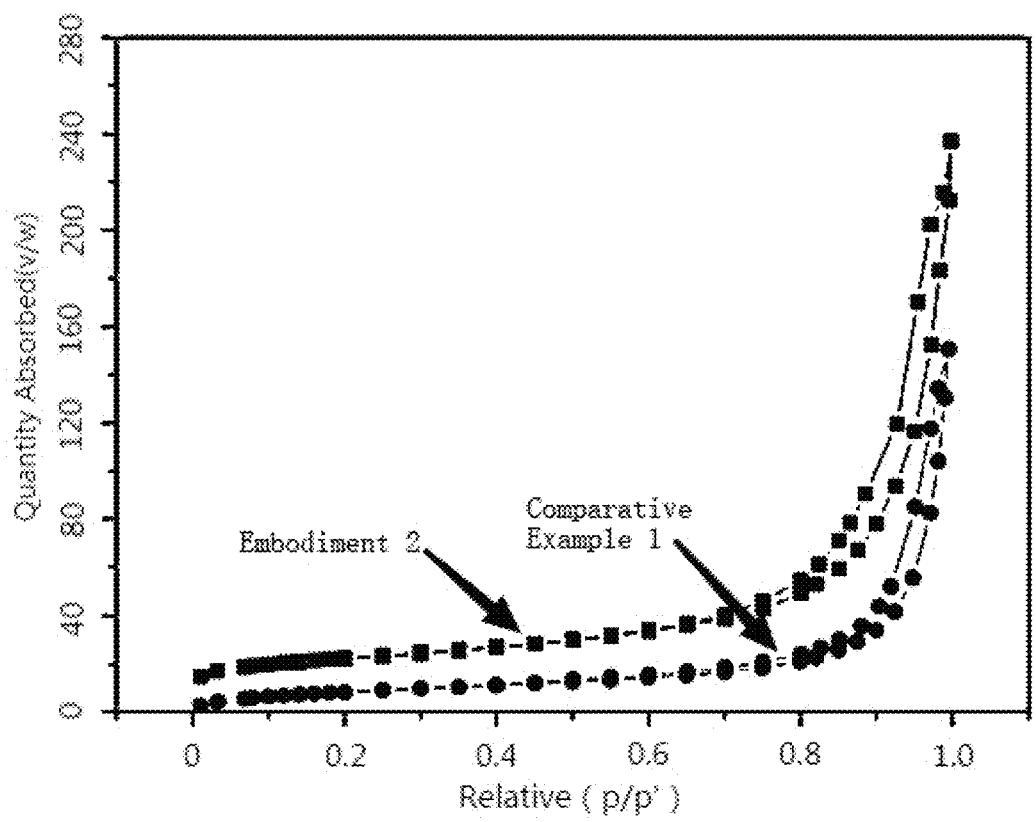
FIG. 4 shows isothermal adsorption/desorption curves of the adsorbents in Embodiment 2 and Comparative Example 1 of the present invention.

FIG. 4 shows isothermal adsorption/desorption curves of the adsorbents in Embodiment 2 and Comparative Example 1 of the present invention. An adsorption amount in a low-pressure area of 0 to 0.6 in the drawing is less, without an inflection point, which indicates that an acting force between the adsorbent and an adsorbate is rather weak, with higher relative pressure and more adsorption amount, showing more obvious pore adsorption. In addition, an adsorption amount in Embodiment 2 is higher than that in Comparative Example 1.

Comparative Example 2 (not Subjected to Alcohol-Thermal Activation Reaction)

In this comparative example, a lithium-silicate-based adsorbent was prepared by a specific process as follows:

1. preparing a lithium-silicate-based polymer: mixing butyl methacrylate, 1.4 wt % sulfuric acid and glycerin according to a mass ratio of 1:1:1 in an acid-proof cup, placing the acid-proof cup in a water bath kettle at 115° C. for stirring for 4 hours to obtain a first solution, then adding $Li_2O \cdot SiO_2$, N,N'-methylene bisacrylamide and an initiator into the first solution, and stirring the mixture for reaction at 150° C. for 5 hours to obtain a second solution (wherein, a ratio of the first solution to lithium silicate and the N,N'-methylene bisacrylamide was 1.5:1.2:0.1 (ml/g/g), and an addition amount of the initiator was 5% of a total amount of the butyl methacrylate and the N,N'-methylene bisacrylamide), and conveying the second solution to an oven for subjecting to low-temperature dehydration at 98° C., cooling and drying to obtain the brown lithium-silicate-based polymer;
2. preparing a porous and reticulated lithium-silicate-based adsorbent: mixing 100 ml of waterproof cotton fiber, tartaric acid and carboxymethyl cellulose according to a mass ratio of 5:1.8:0.75 (g/ml/ml) and evenly stirring the same by a magnetic force to obtain a third solution, mixing the lithium-silicate-based polymer and the third solution according to a ratio of 85:25 (g/ml), and placing the mixture in a tube furnace for carbonizing at a low temperature of 280° C. for 8 hours under a nitrogen gas flow to obtain the black porous and reticulated lithium-silicate-based adsorbent; and
3. applying the porous lithium-silicate-based adsorbent: coating a polypropylene mesh fabric with sodium silicate sand, spraying 50 g of porous and reticulated lithium-silicate-based adsorbent on the polypropylene mesh fabric, and placing the polypropylene mesh fabric at an overflow port of an anaerobic tank for adsorption treatment for 1.5 hours.

Comparative Example 3 (Activated Carbon Treatment)

Application of activated carbon adsorbent: a polypropylene mesh fabric was coated with sodium silicate sand, 50 g of activated carbon was sprayed on the polypropylene mesh fabric, and the polypropylene mesh fabric was placed at an overflow port of an anaerobic tank for adsorption treatment for 1.5 hours.

TABLE 1

Adsorption performance analysis of Embodiments 1 to 5 and Comparative Examples 1 to 3

| Group | Water quality in upstream and downstream of overflow port | COD (mg/L) | Li (mg/L) |
|---|---|---|---|
| Embodiment 1 | Upstream of overflow port | 256 | 76 |
| | Downstream of overflow port | 76 | 74 |
| | Removal rate | 70.30% | 2.60% |
| Embodiment 2 | Upstream of overflow port | 247 | 76 |
| | Downstream of overflow port | 73 | 73 |
| | Removal rate | 70.40% | 3.90% |
| Embodiment 3 | Upstream of overflow port | 263 | 77 |
| | Downstream of overflow port | 92 | 75 |
| | Removal rate | 65.00% | 2.70% |
| Embodiment 4 | Upstream of overflow port | 252 | 78 |
| | Downstream of overflow port | 93 | 75 |
| | Removal rate | 63.50% | 3.80% |
| Embodiment 5 | Upstream of overflow port | 246 | 76 |
| | Downstream of overflow port | 84 | 73 |
| | Removal rate | 65.90% | 3.90% |
| Comparative Example 1 | Upstream of overflow port | 259 | 77 |
| | Downstream of overflow port | 103 | 71 |
| | Removal rate | 60.20% | 7.80% |
| Comparative Example 2 | Upstream of overflow port | 269 | 76 |
| | Downstream of overflow port | 104 | 71 |
| | Removal rate | 61.34% | 6.60% |
| Comparative Example 3 | Upstream of overflow port | 254 | 75 |
| | Downstream of overflow port | 76 | 43 |
| | Removal rate | 70.08% | 42.67% |

It can be seen from adsorption data of Embodiments 1 to 5 and Comparative Examples 1 to 3 that the adsorption treatment is carried out on the wastewater subjected to the biochemical treatments such as the flocculation precipitation, the anaerobic treatment and the anoxic treatment with the adsorbents prepared in Embodiments 1 to 5 and Comparative Examples 1 to 2, which has little effect on a concentration of lithium in the wastewater, while the removal rate of lithium in the wastewater subjected to the adsorption treatment (with the activated carbon) in Comparative Example 3 exceeds 40%, which indicates that the lithium-silicate-based adsorbent of the present invention has the function of absorbing the COD in the wastewater selectively, which is because that there are more lithium sites on the lithium-silicate-based adsorbent, with correspondingly weak lithium adsorption and poor lithium adsorption capacity, so that the lithium-silicate-based adsorbent has the function of absorbing the COD in the wastewater selectively, and has little interference to the lithium in the wastewater. In addition, the removal rates of Comparative Example 1 and Comparative Example 2 are also lower than those of Embodiments, which is because that Comparative Example 1 has no embedded fiber, so that the adsorption performance is reduced, and Comparative Example 2 is not subjected to the alcohol-thermal activation reaction, so that the adsorbent has the poor hydrophilicity and the reduced adsorption performance.

The embodiments of the present invention are described in detail with reference to the drawings above, but the present invention is not limited to the above embodiments, and various changes may also be made within the knowledge scope of those of ordinary skills in the art without departing from the purpose of the present invention. In addition, the embodiments of the present invention and the features in the embodiments may be combined with each other without conflict.

The invention claimed is:
1. A preparation method of a lithium-silicate-based adsorbent, comprising the following step of:
    S1: mixing and stirring butyl methacrylate, an acid and an organic solvent to obtain a first solution, adding lithium silicate, an initiator and N,N'-methylene bisacrylamide into the first solution, heating and stirring a resulting mixture for reaction to obtain a second solution, and subjecting the second solution to low-temperature dehydration, cooling and drying to obtain a lithium-silicate-based polymer; and
    S2: mixing the lithium-silicate-based polymer with a third solution, and carbonizing a resulting mixture at low temperature under an anoxic condition to obtain a lithium-silicate-based adsorbent, wherein the third solution is obtained by mixing a cotton fiber, a tartaric acid and a carboxymethyl cellulose with water.

2. The preparation method of claim 1, wherein in step S1, a mass ratio of the butyl methacrylate, the acid and the organic solvent is (0.1 to 5):(0.01 to 2):(0.01 to 1), a concentration of the acid ranges from 0.02 mol/L to 0.10 mol/L, and the organic solvent is at least one of ethylene glycol, glycerin or propylene glycol.

3. The preparation method of claim 1, wherein in step S1, the lithium silicate is one of $Li_2O \cdot SiO_2$ or $2Li_2O \cdot SiO_2$.

4. The preparation method of claim 1, wherein in step S1, a time for the stirring is 4 hours to 20 hours, and a temperature for the stirring is 30° C. to 120° C.

5. The preparation method of claim 1, wherein in step S1, a liquid-solid ratio of the first solution, the lithium silicate and the N,N'-methylene bisacrylamide is (1 to 5) ml:(1 to 2) g:(0.1 to 0.5) g.

6. The preparation method of claim 1, wherein in step S2, a solid-liquid ratio of the lithium-silicate-based polymer to the third solution is (70 to 120):(5 to 50) g/ml.

7. The preparation method of claim 1, wherein in step S2, in the third solution, a mass ratio of the cotton fiber, the tartaric acid and the carboxymethyl cellulose is (0.1 to 5):(0.01 to 2):(0.01 to 1).

8. The preparation method of claim 1, wherein in step S2, the carbonizing at low temperature is carried out at a temperature of 120° C. to 300° C., and lasts for 8 hours to 24 hours.

9. A method for removing COD in wastewater, comprising the following steps of: mixing the lithium-silicate-based adsorbent prepared by the preparation method of claim 1 with an alcohol, heating a resulting mixture for reaction to obtain a hydrophilic lithium-silicate-based adsorbent, attaching the hydrophilic lithium-silicate-based adsorbent to a carrier, and then placing the carrier at an overflow port, a water outlet or a water passage sink of a flocculation precipitation tank, an anaerobic tank or an anoxic tank for adsorption treatment.

10. The method of claim 9, wherein a solid-liquid ratio of the lithium-silicate-based adsorbent to the alcohol is 10:(1 to 5) g/ml; and the heating is carried out at a temperature of 50° C. to 80° C., and lasts for 10 minutes to 2 hours.

11. A method for removing COD in wastewater, comprising the following steps of: mixing the lithium-silicate-based adsorbent prepared by the preparation method of claim 2 with an alcohol, heating a resulting mixture for reaction to obtain a hydrophilic lithium-silicate-based adsorbent, attaching the hydrophilic lithium-silicate-based adsorbent to a carrier, and then placing the carrier at an overflow port, a water outlet or a water passage sink of a flocculation precipitation tank, an anaerobic tank or an anoxic tank for adsorption treatment.

12. A method for removing COD in wastewater, comprising the following steps of: mixing the lithium-silicate-based adsorbent prepared by the preparation method of claim 3 with an alcohol, heating a resulting mixture for reaction to obtain a hydrophilic lithium-silicate-based adsorbent, attaching the hydrophilic lithium-silicate-based adsorbent to a carrier, and then placing the carrier at an overflow port, a water outlet or a water passage sink of a flocculation precipitation tank, an anaerobic tank or an anoxic tank for adsorption treatment.

13. A method for removing COD in wastewater, comprising the following steps of: mixing the lithium-silicate-based adsorbent prepared by the preparation method of claim 4 with an alcohol, heating a resulting mixture for reaction to obtain a hydrophilic lithium-silicate-based adsorbent, attaching the hydrophilic lithium-silicate-based adsorbent to a carrier, and then placing the carrier at an overflow port, a water outlet or a water passage sink of a flocculation precipitation tank, an anaerobic tank or an anoxic tank for adsorption treatment.

14. A method for removing COD in wastewater, comprising the following steps of: mixing the lithium-silicate-based adsorbent prepared by the preparation method of claim 5 with an alcohol, heating a resulting mixture for reaction to obtain a hydrophilic lithium-silicate-based adsorbent, attaching the hydrophilic lithium-silicate-based adsorbent to a carrier, and then placing the carrier at an overflow port, a water outlet or a water passage sink of a flocculation precipitation tank, an anaerobic tank or an anoxic tank for adsorption treatment.

15. A method for removing COD in wastewater, comprising the following steps of: mixing the lithium-silicate-based adsorbent prepared by the preparation method of claim 6 with an alcohol, heating a resulting mixture for reaction to obtain a hydrophilic lithium-silicate-based adsorbent, attaching the hydrophilic lithium-silicate-based adsorbent to a carrier, and then placing the carrier at an overflow port, a water outlet or a water passage sink of a flocculation precipitation tank, an anaerobic tank or an anoxic tank for adsorption treatment.

16. A method for removing COD in wastewater, comprising the following steps of: mixing the lithium-silicate-based adsorbent prepared by the preparation method of claim 7 with an alcohol, heating a resulting mixture for reaction to obtain a hydrophilic lithium-silicate-based adsorbent, attaching the hydrophilic lithium-silicate-based adsorbent to a carrier, and then placing the carrier at an overflow port, a water outlet or a water passage sink of a flocculation precipitation tank, an anaerobic tank or an anoxic tank for adsorption treatment.

17. A method for removing COD in wastewater, comprising the following steps of: mixing the lithium-silicate-based adsorbent prepared by the preparation method of claim 8 with an alcohol, heating a resulting mixture for reaction to obtain a hydrophilic lithium-silicate-based adsorbent, attaching the hydrophilic lithium-silicate-based adsorbent to a carrier, and then placing the carrier at an overflow port, a water outlet or a water passage sink of a flocculation precipitation tank, an anaerobic tank or an anoxic tank for adsorption treatment.

18. The method of claim 11, wherein a solid-liquid ratio of the lithium-silicate-based adsorbent to the alcohol is 10:(1 to 5) g/ml; and the heating is carried out at a temperature of 50° C. to 80° C., and lasts for 10 minutes to 2 hours.

19. The method of claim 12, wherein a solid-liquid ratio of the lithium-silicate-based adsorbent to the alcohol is 10:(1 to 5) g/ml; and the heating is carried out at a temperature of 50° C. to 80° C., and lasts for 10 minutes to 2 hours.

20. The method of claim 13, wherein a solid-liquid ratio of the lithium-silicate-based adsorbent to the alcohol is 10:(1 to 5) g/ml; and the heating is carried out at a temperature of 50° C. to 80° C., and lasts for 10 minutes to 2 hours.

\* \* \* \* \*